US008393395B2

(12) United States Patent
Cochet et al.

(10) Patent No.: US 8,393,395 B2
(45) Date of Patent: Mar. 12, 2013

(54) USE OF ENCAPSULATED CHEMICAL DURING FRACTURING (75) Inventors: Thomas Cochet, Paris (FR); Trevor Hughes, Cambridge (GB); Slaheddine Kefi, Velizy Villacoublay (FR); Valerie Lafitte, Cambridge (GB); Khooi Tan, Coton (GB); Gary Tustin, Sawston (GB); Shiyi Wang, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 220 days.

(21) Appl. No.: 12/477,442

(22) Filed: Jun. 3, 2009

(65) Prior Publication Data

US 2010/0307744 A1 Dec. 9, 2010

(51) Int. Cl.
*E21B 43/26* (2006.01)
*E21B 43/16* (2006.01)

(52) U.S. Cl. .................. 166/308.1; 166/305.1; 166/300; 166/308.2

(58) Field of Classification Search .................. None
See application file for complete search history.

(56) References Cited

U.S. PATENT DOCUMENTS

| | | | |
|---|---|---|---|
| 2,693,854 A * | 11/1954 | Abendroth | 166/278 |
| 3,796,883 A | 3/1974 | Smith et al. | |
| 3,987,850 A | 10/1976 | Fitch | |
| 4,008,763 A | 2/1977 | Lowe, Jr. | |
| 4,264,329 A | 4/1981 | Beckett | |
| 4,456,067 A | 6/1984 | Pinner, Jr. | |
| 4,506,734 A | 3/1985 | Nolte | |
| 4,614,599 A | 9/1986 | Walker | |
| 4,738,897 A * | 4/1988 | McDougall et al. | 428/402 |
| 4,919,209 A | 4/1990 | King | |
| 4,986,354 A | 1/1991 | Cantu et al. | |
| 5,110,486 A | 5/1992 | Manalastas et al. | |
| 5,238,065 A | 8/1993 | Mondshine et al. | |
| 5,253,711 A | 10/1993 | Mondshine | |
| 5,437,331 A * | 8/1995 | Gupta et al. | 166/300 |
| 5,478,564 A | 12/1995 | Wantier et al. | |
| 5,518,996 A | 5/1996 | Maroy et al. | |
| 5,613,558 A | 3/1997 | Dilenbeck, III | |
| 5,624,886 A | 4/1997 | Dawson et al. | |
| 5,658,861 A | 8/1997 | Nelson et al. | |
| 5,892,147 A | 4/1999 | Games et al. | |
| 5,922,652 A | 7/1999 | Kowalski et al. | |
| 5,929,437 A | 7/1999 | Elliott et al. | |
| 5,948,735 A | 9/1999 | Newlove et al. | |
| 6,192,985 B1 | 2/2001 | Hinkel et al. | |
| 6,280,495 B1 | 8/2001 | Doetsch et al. | |
| 6,326,335 B1 | 12/2001 | Kowalski et al. | |
| 6,380,136 B1 | 4/2002 | Bates et al. | |
| 6,444,316 B1 | 9/2002 | Reddy et al. | |
| 6,527,051 B1 | 3/2003 | Reddy et al. | |
| 6,554,071 B1 | 4/2003 | Reddy et al. | |
| 6,645,769 B2 | 11/2003 | Tayebi et al. | |
| 6,659,175 B2 | 12/2003 | Malone et al. | |
| 6,723,683 B2 | 4/2004 | Crossman et al. | |
| 6,764,980 B2 | 7/2004 | Bates et al. | |
| 6,799,634 B2 | 10/2004 | Hartog et al. | |
| 6,818,594 B1 | 11/2004 | Freeman et al. | |
| 6,840,318 B2 | 1/2005 | Lee et al. | |
| 6,861,394 B2 | 3/2005 | Ballard et al. | |
| 6,881,709 B2 | 4/2005 | Nelson et al. | |
| 6,908,888 B2 | 6/2005 | Lee et al. | |
| 7,032,662 B2 | 4/2006 | Malone et al. | |
| 7,049,272 B2 | 5/2006 | Sinclair et al. | |
| 7,066,260 B2 | 6/2006 | Sullivan et al. | |
| 7,081,211 B2 | 7/2006 | Li et al. | |
| 7,096,947 B2 | 8/2006 | Todd et al. | |
| 7,166,560 B2 | 1/2007 | Still et al. | |
| 7,196,040 B2 | 3/2007 | Heath et al. | |
| 7,204,312 B2 | 4/2007 | Ruddy et al. | |
| 7,219,731 B2 | 5/2007 | Sullivan et al. | |
| 7,265,079 B2 | 9/2007 | Willberg et al. | |
| 7,275,596 B2 | 10/2007 | Willberg et al. | |
| 7,287,590 B1 | 10/2007 | Sullivan et al. | |
| 7,337,839 B2 * | 3/2008 | Ayoub et al. | 166/250.1 |
| 7,347,260 B2 | 3/2008 | Ferguson et al. | |
| 7,560,690 B2 | 7/2009 | Stray et al. | |
| 7,703,521 B2 | 4/2010 | Sullivan et al. | |
| 7,748,452 B2 | 7/2010 | Sullivan et al. | |
| 2003/0196799 A1 | 10/2003 | Nguyen et al. | |
| 2004/0014607 A1 | 1/2004 | Sinclair et al. | |

(Continued)

FOREIGN PATENT DOCUMENTS

EP 1259700 B1 5/2007
GB 2434165 A 7/2007

(Continued)

OTHER PUBLICATIONS

"disperse" definition. retrieved Mar. 25, 2011 from http://dictionary.reference.com/browse/disperse.*
Allen: "Particle size measurement", 4th edition, Chapman and Hall, London, 1990, pp. 124-156, 715-718.
Anderson et al: "Biodegradation and biocompatibility of PLA and PLGA microspheres", Advanced Drug Delivery Reviews, vol. 28, issue 1, 1997, pp. 5-24.
Ayoub et al: "New findings in fracture cleanup change common industry perception", Society of Petroleum Engineers 2006 international Symposium and Exhibition on Formation Damage Control, Lafayette, LA, Feb. 15-17, 2006, SPE98746.

(Continued)

*Primary Examiner* — Angela M DiTrani (57) ABSTRACT

A process for hydraulic fracturing of a subterranean reservoir formation penetrated by a wellbore includes pumping a fracturing fluid or other aqueous fluid from the surface via the wellbore and into the reservoir. This fluid is an aqueous suspension of particles which each comprise an oilfield chemical distributed within an encapsulating matrix of water-insoluble carrier material. The encapsulating matrix is chosen so as to provide a delayed release of the oilfield chemical from the particles into surrounding fluid, such that oilfield chemical is liberated from the particles after they have entered the fracture. The encapsulating matrix may be a polymer which is at least partially amorphous, with a glass transition temperature below the reservoir temperature.

26 Claims, 2 Drawing Sheets

U.S. PATENT DOCUMENTS

| | | | |
|---|---|---|---|
| 2004/0094297 A1* | 5/2004 | Malone et al. ............ | 166/250.12 |
| 2004/0112255 A1 | 6/2004 | Bruno et al. | |
| 2004/0115378 A1 | 6/2004 | Dunaway et al. | |
| 2005/0000690 A1 | 1/2005 | Boney | |
| 2006/0166838 A1 | 7/2006 | Collins et al. | |
| 2007/0032386 A1* | 2/2007 | Abad et al. ..................... | 507/201 |
| 2007/0214878 A1 | 9/2007 | Anderson | |
| 2008/0070809 A1* | 3/2008 | Sullivan et al. .............. | 507/211 |
| 2008/0287325 A1 | 11/2008 | Thompson et al. | |

FOREIGN PATENT DOCUMENTS

| | | |
|---|---|---|
| WO | 9322537 A1 | 11/1993 |
| WO | 0103676 A1 | 1/2001 |
| WO | 0212674 A1 | 2/2002 |
| WO | 03054109 A1 | 7/2003 |
| WO | 03106809 A1 | 12/2003 |
| WO | 2005095538 A1 | 10/2005 |
| WO | 2005095755 A1 | 10/2005 |
| WO | 2006004426 A1 | 1/2006 |
| WO | 2006047478 A2 | 5/2006 |
| WO | 2007132137 A1 | 11/2007 |

OTHER PUBLICATIONS

Ayoub et al: "New results improve fracture cleanup characterization and damage mitigatio", Society of Petroleum Engineers 2006 Annual Technical Conference and Exhibition, San Antonio, Texas Sep. 24-27, 2006, SPE102326.

Blanco et al: "Degradation behaviour of microspheres prepared by spray-drying poly(D,L-lactide) and poly(D,L-lactide-co-glycolide) polymers", International Journal of Pharmaceutics, vol. 326, issues 1-2, 2006, pp. 139-147.

Blanco-Prieto et al: "Importance of single or blended polymer types for controlled in vitro release and plasma levels of a somatostatin analogue entrapped in PLA/PLGA microspheres", Journal of Controlled Release, vol. 96, issue 3, 2004, pp. 437-448.

Cleland: "Solvent evaporation processes for the production of controlled release biodegradable microsphere formulations for therapeutics and vaccines", Biotechnol. Prog., vol. 14, 1998, pp. 102-107.

Collins et al: "The development of a revolutionary scale-control product for the control of near-well bore sulfate scale within production wells by the treatment of injection seawater", Society of Petroleum Engineers 2006 Oilfield Scale Symposium, Aberdeen May 31-Jun. 1, 2006, SPE100357.

Crews: "Internal phase breaker technology for viscoelastic surfactant gelled fluids", Society of Petroleum Engineers 2005 International Symposium on Oilfield Chemistry, Houston, Texas, Feb. 2-4, 2005, SPE 93449.

Freiberg et al: "Polymer microspheres for controlled drug release", International Journal of Pharmaceutics, vol. 282, issues 1-2, 2004, pp. 1-18.

Freitas et al: "Microencapsulation by solvent extraction/evaporation: reviewing the state of the art microsphere preparation process technology", Journal of Controlled Release, vol. 102, issue 2, 2005, pp. 313-332.

Gardien et al: "Hydraulic fracture diagnosis using chemical tracers", Society of Petroleum Engineers 1996 Annual Technical Conference and Exhibition, Denver, Colorado, Oct. 6-9, 1996, SPE 36675.

Guibis et al: "Encapsulated breaker for aqueous polymeric fluids", Society of Petroleum Engineers, SPE19433, 1992, pp. 9-14.

Haider et al: "Genetically engineered polymers: status and prospects for controlled release", Journal of Controlled Release, vol. 95, issue 1, 2004, pp. 1-26.

Holland et al: "Polymers for biodegradable medical devices. 1. The potential of polyesters as controlled macromolecular release systems", Journal of Controlled Release, vol. 4, issue 3, 1986, pp. 155-180.

Jain: "The manufacturing techniques of various drug loaded biodegradable poly(lactide-co-glycolide) (PLGA) devices", Biomaterials, vol. 21, No. 23, 2000, pp. 2475-2490.

Jeong et al, "Biodegradable block copolymers as injectable drug-delivery systems", Nature, vol. 388, Aug. 1997, pp. 860-862.

Lee et al: "Double-walled microspheres for the sustained release of a highly water-soluble drug: characterization and irradiation studies", Journal of Controlled Release, vol. 83, issue 3, 2002, pp. 437-452.

Lin et al: "Effects of hydroxyapatite dosage on mechanical and biological behaviors of polylactic acid composite materials", Materials Letters, vol. 61, issues 14-15, 2007, pp. 3009-3013.

Lunt: "Large-scale production, properties and commercial applications of polylactic acid polymers", Polymer Degradation and Stability, vol. 59, 1998, pp. 145-152.

McDaniel et al: "A new environmentally acceptable technique for determination of propped fracture height and width", Society of Petroleum Engineers 2007 Annual Technical Conference and Exhibition, Anaheim, California, Nov. 11-14, 2007, SPE109969.

Okada: "Chemical syntheses of biodegradable polymers", Prog. Polym. Sci., vol. 27, 2002, pp. 87-133.

Oksman et al: "Natural fibres as reinforcement in polylactic acid (PLA) composites", Composites Science and Technology, vol. 63, issue 9, 2003, pp. 1317-1324.

Pandey et al: "Fracture stimulation utilizing a viscoelastic-surfactant-based system in the Morrow Sands in Southeast New Mexico", Society of Petroleum Engineers 2007 International Symposium on Oilfield Chemistry, Houston, Texas, Feb. 28-Mar. 2, 2007, SPE102677.

Park: "Degradation of poly(lactic-co-glycolic acid) microspheres: effect of copolymer composition", Biomaterials, vol. 16, No. 15, 1995, pp. 1123-1130.

Rawle: "Basic principles of particle size analysis", Technical Paper, Malvern Instruments Ltd, Malvern, United Kingdom, Application note: MRK034 (www.malvern.co.uk), pp. 1-8.

Robinson Brothers LTD: "Additives for biodegradable polylactic acid compounds", Additives for Polymers, Jul. 2003, p. 3.

Shogren et al: "Biodegradation of starch/polylactic acid/poly(hydroxyester-ether) composite bars in soil", Polymer Degradation and Stability, vol. 79, issue 3, 2003, pp. 405-411.

Silveira et al: "Susceptibility of cobalt ferrite nanoparticles dispersed in polylactic acid microspheres", Journal of Magnetism and Magnetic Materials, vol. 272-276, 2004, pp. e1195-e1196.

Sodergard et al, "Properties of lactic acid based polymers and their correlation with composition", Progr. Polym. Sci., vol. 27, 2002, pp. 1123-1163.

Solvay: "IXPER 75C Calcium peroxide: dough conditioner. Application data sheet", Solvay Chemicals, IXP-03-002, www.solvaychemicals.us, 2004, pp. 1-5.

Sudesh et al: "Synthesis, structure and properties of polyhydroxyalkanoates: biological polyesters", Progress in Polymer Science, vol. 25, No. 10, 2000, pp. 1503-1555.

Suriyamongkol et al: "Biotechnological approaches for the production of polyhydroxyalkanoates in microorganisms and plants—A review", Biotechnology Advances, vol. 25, issue 25, 2007, pp. 148-175.

Uhrich et al: "Polymeric systems for controlled drug release", Chemical Reviews, vol. 99, No. 11, 1999, pp. 3181-3198.

International Search report of PCT Application Serial No. PCT/IB2010/001088 dated Jan. 28, 2011.

Craig D. Morgan, "Increased Oil Production and Reserves from Improved Completion Techniques in the Bluebell Field# Uinta Basin# Utah," Utah Geological Survey, Quarterly Technical Report: Jan. 1-Mar. 3, 1997: pp. 1-8.

* cited by examiner

USE OF ENCAPSULATED CHEMICAL DURING FRACTURING

FIELD OF THE INVENTION

This invention relates to the delivery of an oilfield chemical to a subterranean hydrocarbon reservoir in the course of hydraulic fracturing. The subterranean reservoir may hold oil, gas or both.

BACKGROUND OF THE INVENTION

It is well-known to deliver so-called oilfield chemicals (using this common term to include chemicals used in connection with either natural gas or oil and to include biochemicals such as nucleic acids and enzymes) to a subterranean hydrocarbon reservoir to bring about a variety of functions at various stages of hydrocarbon production. Methods for delivering oilfield chemicals to a reservoir include methods in which the chemical is made into the form of particles which are suspended in the fluid which is pumped down a wellbore to the reservoir. Common methods for forming particles are absorption into the pores of porous carrier particles and encapsulation as a core-shell structure in which a single quantity (the core) of the oilfield chemical is enclosed within a shell of carrier material.

Hydraulic fracturing is a well established technique for stimulating production from a hydrocarbon reservoir. In a conventional fracturing procedure a thickened aqueous fracturing fluid is pumped into the reservoir formation through a wellbore and opens a fracture in the formation. Thickened fluid is then also used to carry a particulate proppant into the fracture. Once the fracture has been made and packed with proppant, pumping is stopped. The formation closes onto the proppant pack and oil or gas can flow through the proppant pack to the wellbore. At least some of the aqueous fracturing fluid in the wellbore will be driven back to the surface by fluid produced from the reservoir. Thickener which increases the viscosity of the fracturing fluid may be a polysaccharide. Guar gum, often crosslinked with borate or a zirconium compound, is frequently used. Another category of thickeners which is used is viscoelastic surfactants. An oilfield chemical may be delivered to a reservoir during fracturing. If the fracturing fluid contains a viscosifying thickener, it is normal to supply a so-called breaker (which is usually a chemical or an enzyme) into the fracture to degrade the thickener and to reduce the viscosity of the fluid in the fracture after it has served its purpose. This facilitates the flow back to the surface and the flow of produced fluid through the proppant pack towards the wellbore.

U.S. Pat. No. 4,506,734 teaches the encapsulation of a breaker chemical, which may be an enzyme, within particles which are crushed by the fracture when pumping ceases and the fracture is allowed to close onto the proppant pack. This of course delays release of the breaker chemical until the fracture formation is complete.

U.S. Pat. No. 5,437,331 discloses an encapsulated enzyme breaker formed by a procedure in which porous beads of polymer are made and exposed to a solution of the enzyme which is absorbed into the open pores of the polymer beads. Examples in the document showed that this delayed release of the enzyme compared to incorporating enzyme solution directly into a model fracturing fluid.

Proposals for encapsulation of oilfield chemicals in contexts other than hydraulic fracturing include U.S. Pat. No. 6,818,594 which teaches the use of enzymes which are enclosed within a polymer capsule as a breaker for filtercake formed while drilling a well.

WO 03/106809 teaches particles in which an oilfield chemical (in the form of small droplets of aqueous solution) is enclosed in a matrix of an encapsulating polymer. This polymer is chosen so as to be soluble or otherwise degradable under conditions which are encountered within the reservoir after mixing with formation fluid found in the reservoir. The document teaches that these encapsulated particles should be made so small (mean particle diameter below 10 micron) that they can enter the pores of formation rock. Although delivery of particles to a reservoir via a production well is mentioned, an alternative possibility which is suggested is that particles can be delivered to the reservoir via an injection well and then flow through the formation to the vicinity of a production well to release the encapsulated chemical (a scale inhibitor) in the near wellbore region of the production well. This indicates that release of the encapsulated chemical will be sufficiently slow to allow time for travel through the formation from the injection well to the production well.

SUMMARY OF THE INVENTION

In the present invention, one or more oilfield chemicals are incorporated into particles in which the oilfield chemical(s) are distributed within a matrix of encapsulating material. The particles are delivered into a subterranean reservoir and are intended to delay release of the oilfield chemical(s) until they have arrived in the reservoir.

In a first aspect this invention provides a process for hydraulic fracturing of a subterranean reservoir formation penetrated by a wellbore, comprising pumping an aqueous suspension of particles which each comprise an oilfield chemical distributed within an encapsulating matrix of water-insoluble carrier material from the surface via the wellbore and into the reservoir, wherein the encapsulating matrix is chosen so as to provide a delayed release of the oilfield chemical from the particles into surrounding fluid such that oilfield chemical is liberated from the particles after they have entered the fracture. Although the term 'oilfield' is used for convenience, the hydrocarbon in the reservoir may be oil, gas or both.

Generally the process for hydraulic fracturing will include pumping a hydraulic fracturing fluid from the surface via the wellbore and into the reservoir so as to open a fracture of the reservoir formation, and subsequently allowing fluid flow back from the fracture to the wellbore and hence to the surface. This will be followed by producing hydrocarbon from the reservoir via the fracture and the wellbore.

The aqueous suspension of particles which is pumped into the well bore may be a fluid which is distinct from the fracturing fluids, but in many instances it will be convenient for it to be a suspension of the particles in a quantity of hydraulic fracturing fluid.

Normally the encapsulated oilfield chemical and carrier material will be different materials. The carrier matrix serves to retain the encapsulated oilfield chemical for a time and then allows it to be released into the surrounding fluid. It is desirable that this should enable most or all of the chemical to be retained within the particles during handling at the surface and during travel down the wellbore but subsequently allow the chemical to be liberated into the fracture. At least 75% and preferably at least 90% of the oilfield chemical may be retained within the particles until after they enter the fracture.

Having the encapsulated oilfield chemical distributed within the matrix of carrier material can avoid the possibility that particles which consist of a shell enclosing a core of oilfield chemical are ruptured accidentally and release their entire content of oilfield chemical prematurely.

It is possible, within the scope of this invention, that the oilfield chemical is dissolved in the material of the carrier matrix. However, in significant forms of this invention the oilfield chemical takes the form of a multiplicity of relatively small particles distributed within a relatively larger particle of the carrier matrix (an 'islands in the sea' model). Although such particles of the oilfield chemical are much smaller than the particles of carrier matrix enclosing them, they are large compared with molecular dimensions and hence different from dissolved material.

DETAILED DESCRIPTION

As mentioned above the encapsulated oilfield chemical is distributed within a matrix of carrier material. The relative dimensions and quantities may be such that the amount of oilfield chemical encapsulated within a particle is between 1 and 50 wt% of the overall particle, possibly between 1 and 25 wt%. The median size of the overall particles may lie between 10 and 10,000 times the median size of the relatively small particles of oilfield chemical encapsulated within the carrier matrix.

A suitable carrier matrix material may be an organic polymer chosen to enable the required retention and subsequent release of the oilfield chemical. However, it is possible that an inorganic material could be used as a carrier, one possibility being a matrix of precipitated silica.

Release of the encapsulated oilfield chemical may be brought about in a number of ways. One possibility is by exposure to the reservoir temperature. The encapsulating carrier matrix material may therefore be chosen so as to liberate the oilfield chemical from the particles into surrounding fluid at a rate which increases with temperature, such that oilfield chemical is liberated from the particles after they have entered the fracture. Reservoir temperatures are generally higher than ambient temperatures at the surface. A high percentage of all fracturing jobs take place with reservoir temperatures in a range from 40° C. to 175° C.

We have found that response to temperature can provide a very effective switch between a) effective enclosure of the oilfield chemical within the particles, so that there is little or no release during formulation and handling of fracturing fluid at ambient temperature on the surface, and b) release of the encapsulated oilfield chemical at an acceptably rapid rate when particles enter the formation and become heated to the reservoir temperature.

Thus it is possible to retain an oilfield chemical within an encapsulating matrix during formulation and transportation, deliver a high proportion of the chemical, still encapsulated, into a fracture, and then release the chemical where it is required.

Utilizing the temperature of the reservoir to cause release of the chemical is beneficial in the context of fracturing when a large volume of aqueous fracturing fluid is pumped into the reservoir and for the most part does not mix with formation fluid previously present. An increase in temperature towards the natural temperature of the reservoir happens inevitably, even though there is little or no mixing with the formation fluid. It is possible to avoid the inconvenience and cost of pumping in an additional fluid merely to induce some other change (for example a change in pH).

We have found that temperature responsive release within a fracture can be obtained through choice of the encapsulating matrix material with reference to the subterranean reservoir temperature. This choice of matrix material can also regulate the rate of release at the reservoir temperature. For these purposes the encapsulating matrix material, which is generally an amorphous or partially amorphous polymer, is chosen so that the dry polymer has a glass transition temperature Tg which is above ambient but below the subterranean reservoir temperature.

Glass transition temperature $T_g$ is a characteristic of amorphous materials, notably polymers. Many polymers have a solid appearance at ambient temperature, but are in fact wholly or partially in an amorphous glassy state. A glass is a liquid which is undercooled (sometimes termed supercooled) significantly below its true melting point and which has an extremely high viscosity. In a glass, diffusive processes other than the movement of some very small molecules, take place at extremely low rates, such as micron per year. Above a temperature known as the glass transition temperature Tg, the viscosity drops rapidly and the glass turns into a rubber, then as temperature increases further it turns into a deformable plastic which at even higher temperatures turns into a fluid. Tg is a parameter which is used in many areas of science and industry. Tg values can be determined using a differential scanning calorimeter and can be detected as a point at which a plot of heat input against temperature passes through an inflection point, thus giving a maximum of the first temperature derivative. When measuring Tg it is desirable to operate the differential scanning calorimeter at a temperature ramp rate between 5 and 10° C. per minute.

We have found that an encapsulating matrix becomes permeable when the particle is heated above Tg of the matrix. So if the particles are below Tg at the surface but become heated above Tg after they have been placed in the subterranean fracture, the matrix is effective to enclose the oilfield chemical while the particles are at the surface, but then within the fracture the particles become permeable and allow the encapsulated oilfield chemical to escape into to the surrounding fluid. The release of the encapsulated chemical will take place by a process of diffusion through the matrix of carrier material which may remain intact. In order to have a Tg above ambient surface temperature, the matrix may have a Tg above 30° C. and possibly above 35 or 40° C.

During transit to the reservoir, the fracturing fluid will pass through a wellbore exposed to subterranean temperatures and will begin to heat up, but flow rates during fracturing are generally sufficiently high that fluid is still well below the reservoir temperature when it enters the fracture.

If particles are exposed to a prevailing subterranean temperature which is not much above Tg of the matrix, such as between 5 and 20° C. above Tg, the encapsulated oilfield chemical diffuses slowly out of the particles providing controlled release of the chemical over a period of time. By contrast if the prevailing temperature is well above Tg, the encapsulated oilfield chemical is released much more quickly: for example, a high percentage of the chemical might be released over as short a time as two hours. Release of the encapsulated chemical may be at least 50% and possibly at least 95 or 99% complete before hydrocarbon production is resumed, which may be within a period of 5 days or less, possibly 24 hours or less, after the fracturing fluid(s) have been pumped into the wellbore. Alternatively, release of the oilfield chemical may be slower, so that at least 50% of the chemical is not released until at least 5 days have elapsed since the particles were pumped into the reservoir, possibly longer such as at least 10 days.

Whilst Tg is a useful parameter to explain and predict release rates at reservoir temperature, it should be appreciated that actual rates of release can be simulated and measured by using a laboratory oven to expose samples to the temperature of a reservoir.

Another possibility for the release of the oilfield chemical is that the carrier material is chosen so that it undergoes chemical degradation within a fracture. For example the carrier matrix may be a substance which undergoes hydrolysis, notably a polymer which is de-polymerised into fragments by hydrolysis, so that the oilfield chemical is liberated through progressive breakdown of the carrier matrix under conditions encountered in the reservoir.

A number of chemical groups have been proposed as providing bonds which can be broken, including ester, acetal, sulfide and amide groups. Polymers incorporating such groups include poly(hydroxyacids), polyesters, polypeptides, polyesteramides and polysulfides. Cleavable groups which are particularly envisaged are ester and amide groups both of which provide bonds which can be broken by a hydrolysis reaction. The rate of hydrolysis will be governed by the prevailing pH and temperature and by the chemical structure of the polymer. The hydrolysis rate of an ester group normally attains a maximum under high pH (alkaline) conditions. Conversely for an amide group, the decomposition rate is at a maximum under low pH (acidic) conditions. Low pH, that is to say acidic, conditions can also be used to cleave acetal groups.

A polymer containing hydrolytically cleavable bonds may be a homopolymer of a hydroxycarboxylic acid or an amino carboxylic acid, so that the polymer is a polyester or a polypeptide. Another possibility is that a polymer containing hydrolytically cleavable bonds may be a block copolymer with the blocks joined through ester or amide bonds. Copolymers which contain blocks joined by ester linkages can be prepared by reaction of a pre-polymer with hydroxy groups and a second pre-polymer containing groups which are able to react with hydroxy groups, notably carboxylic anhydride, acyl halide, ketene, ester, sulfonic acid, or sulfonyl halide.

One or both of the pre-polymers may itself be a polymer or oligomer. Prepolymers with reactive hydroxyl groups include oligosaccharides, synthetic polymers containing primary and secondary hydroxyl groups, such as poly(vinyl alcohol) and poly(hydroxy alkyl(meth)acrylate) copolymers, poly(siloxanes), epoxy resins, dihydroxy-terminated poly(amides), dihydroxy-terminated poly(amines), and dihydroxy-terminated poly(carbonates).

Block copolymers in which the blocks are joined through amide linkages can be prepared from pre-polymers containing amino groups. Examples of such pre-polymers include synthetic polymers that contain reactable primary amine groups, such as aminated polyacrylamide and diamino-terminated poly(amines) and poly(amides).

Examples of monomers or polymers containing groups that can be used to react with the hydroxyl-containing materials listed above to yield degradable ester links between polymer blocks or to react with the amino-containing groups listed above to yield degradable amide links include: aliphatic or aromatic polybasic acids, amides, acid anhydrides such as poly(maleic anhydride) and copolymers; polybasic acid alkyl esters, polybasic acid halides, imides, bisimides; and polysulphonic acids such as poly(styrenesulphonic acid).

It is possible that a carrier matrix material might release encapsulated oilfield chemical by more than one mechanism. For instance an encapsulating matrix polymer may have a Tg above ambient but below the reservoir temperature and also will have a chemical structure which can undergo degradation at the reservoir temperature, eg depolymerisation by hydrolysis. If this is the case, it is possible that both of the above mechanisms of release will play a role so that encapsulated oilfield chemical is released in part by diffusion out of the particle concurrently with release as a result of degradation of the particle. However, it is also possible that one mechanism of release will be faster than the other. For instance it is possible that release in response to temperature will be quicker than any effect of hydrolytic degradation so that the encapsulated oilfield chemical is released by diffusion while the particles remain substantially intact.

Encapsulating matrix polymers which are particularly envisaged for use in this invention include homopolymers and copolymers of hydroxyacids. Examples of homopolymers are polylactic acid and polyglycolic acid. These two polymers have Tg above ambient temperature but below reservoir temperature and are also capable of undergoing hydrolysis back to their monomers, although release through diffusion in response to reservoir temperature may precede degradation through hydrolysis. If a higher Tg value than that of the homopolymer is required, a copolymer may be used. Alternatively one of these homopolymers may be used in a mixture with another polymer of higher Tg, thus giving a mixture with an intermediate Tg.

As mentioned above, the release profile of particles can be observed in laboratory experiments before the particles are used. Such experiments involve exposing a sample quantity of the particles to conditions of pH and temperature which match those found in the subterranean location and monitoring release of encapsulated oilfield chemical over time.

A range of oilfield chemicals may be encapsulated and carried into a reservoir during fracturing. One possibility is a so-called breaker chemical, which when liberated into the fracture causes degradation of the thickener and a reduction in viscosity, thus facilitating the clean-up process of backflowing the fracturing fluid out of the fracture. If the thickener in fracturing fluid comprises a polysaccharide such as guar gum, a breaker chemical may be an oxidizing agent, notably a peroxide. A breaker may be an enzyme able to catalyse the depolymerisation of a polysaccharide. Acids have also been used as breakers. If a thickener in fracturing fluid is a viscoelastic surfactant, such as a viscoelastic quaternary ammonium surfactant, the breaker may be an alcohol, an amine or a carboxylic or dicarboxylic acid incorporating a long hydrocarbon chain so that the alcohol, amine or acid is hydrophobic. A hydrocarbon chain may have at least 12 carbon atoms, for example from 12 or 16 up to 24 carbon atoms. These compounds function as breakers for viscoelastic surfactants. In the case of a carboxylic acid the function as a breaker is observed when the carboxylic acid group is not dissociated into ions and so the fracturing fluid may be formulated to have an acidic pH at which the breaker acid is below its pKa value or it may be formulated to reach such an acidic pH as a result of chemical change Another possibility is that the oilfield chemical is a tracer, that is a substance which is deliberately introduced into a reservoir so that its presence (or absence) in fluid produced from the reservoir will provide information. The use of tracers to obtain information about a hydrocarbon reservoir and/or about what is taking place therein has been practised for several decades and has been described in numerous documents. A tracer may be a dye, fluorescer or other chemical which can be detected using spectroscopic analytical methods such as UV-visible, fluorescence or phosphorescence. Compounds of lanthanide elements may be used as tracers because they have distinctive spectra. A tracer may be a chemical with distinctive features which enables it to be distinguished by another analytical technique such as GC-MS. Such chemicals include fluorocarbons and fluoro-substituted aromatic acids. Genetically coded material has been proposed for use as a tracer (and WO2007/132137 gives a method for detection of biological tags). Radio-isotopes have frequently been used as tracers. Society of Petroleum Engineers paper SPE109,969 discloses the use of materials which can be activated to become short lived radio-isotopes. Salts of ions which do not occur naturally in subterranean reservoirs, such as iodides and thiocyanates may also be used as tracers.

A further example of an oilfield chemical which may be introduced into a reservoir in the course of a fracturing job is an inhibitor to control scale formation or corrosion. Such an inhibitor may have no role in fracturing the reservoir but may be released slowly into the hydrocarbon flow when production is commenced or resumed.-It is envisaged that the oilfield chemical may be of lower molecular weight than the carrier matrix. The oilfield chemical may for instance have a molecular weight no higher than 1000, possibly no higher than 500, while the carrier matrix may be a polymer having molecular weight of least $10^5$, possibly at least $10^6$.

In some embodiments of this invention, the particles are characterised by their size, because this can determine where the particles are placed when they are pumped into a fracture. It may be preferred that the particles have a median particle size of at least 15 micron, possibly at least 25 micron.

While fluid is being pumped into the fracture in the course of fracturing, some fluid leaks off into the porous formation. As mentioned earlier, the hydraulic fluid used in many fracturing operations is an aqueous dispersion of a thickener and in consequence the fluid which leaks off into the formation deposits a filtercake of thickener on the surfaces of the formation which are exposed to the fracture.

In some embodiments of this invention, the particles have a particle size such that they are held by the filtercake and in consequence selectively release the oilfield chemical in the vicinity of the filtercake. The oilfield chemical may then be a breaker which is thus selectively released into the filtercake to degrade the thickener from which the filtercake has formed and thus enhance removal of the filtercake. Thus, in this arrangement the size of the particles provides a way to selectively target the breaker to the location where there is the greatest concentration of thickener (whose thickening property is no longer required). Another possibility is that the oilfield chemical may be a tracer which will be released into the filtercake if that filtercake is still present. Detection of the tracer in the fluid during backflow would be a confirmation of removal of the filtercake. Absence of the tracer from the produced fluid stream during subsequent hydrocarbon production would also be an indication that the filtercake had already been removed successfully.

Delivery of particles to the filtercake may be accomplished by using particles which are too large to pass through the filtercake into the formation pores. Such particles may be mixed into fracturing fluid which is pumped down the wellbore before proppant is placed in the fracture. An alternative is to deliver the particles into the fracture concurrently with, or even after, the proppant but choosing particles which are small enough to pass through the packed proppant whilst also being too large to pass through the filtercake into the formation pores.

In other embodiments of this invention the particles are made large enough that they are retained within the proppant which is packed into the fracture and thus are retained in the fracture during and after the backflow of fluid out of the fracture. This would be appropriate if it is desired to release the oilfield chemical (perhaps a tracer or a scale inhibitor) into fluid from the reservoir after the fracturing fluid has been made to flow out.

Significant size properties for particles are the particle size and the particle size distribution. Discussion of methods of measuring particle size and definitions of different averages of particle size can be found in a Technical paper entitled "Basic Principles of Particle Size Analysis" by Alan Rawle of Malvern Instruments Ltd, Malvern, United Kingdom.

A relevant textbook is "Particle Size Measurement" by Terence Allen (4th ed, published by Chapman and Hall, London, 1990). Instrumentation for determining particle size by the commonly used technique of low angle laser light scattering, more commonly known as laser diffraction, is available from a number of suppliers including Malvern Instruments Ltd. The Malvern Mastersizer is a well known instrument which determines the volumes of individual particles, from which average particle size can be calculated according to several definitions, using computer software which accompanies the instrument.

The size of an individual particle is taken as the diameter of a spherical particle of the same volume, the so-called "equivalent sphere". The software associated with the instrument enables determination of volume median diameter denoted as D[v, 0.5] or $d_{50}$. This is a value of particle size such that 50% (by volume) of the particles have a volume larger than the volume of a sphere of diameter $d_{50}$ and 50% of the particles have a volume smaller than the volume of a sphere of diameter $d_{50}$.

Particle size distribution is conveniently indicated by the values of $d_{10}$ and $d_{90}$ measured by the same instrument. 10% by volume of the particles in a sample have an equivalent diameter smaller than $d_{10}$. 90% by volume are smaller than $d_{90}$ and so 10% by volume are larger than $d_{90}$. The closer together the values of $d_{10}$ and $d_{90}$, the narrower is the particle size distribution.

Although particle size may be used to achieve the selective placement of particles, it may not be essential that every particle reaches its intended target location. So, for particles to be held by the filtercake, the mean size of the particles should be too large to pass through the filtercake and enter pores of the formation, although it may not be essential to prevent the smallest particles from doing so. Thus such particles will have mean particle size $d_{50}$ of at least 10, probably at least 15 or 20 micron but $d_{10}$ may be as low as 3 micron, possibly 5 micron or above. If these particles are intended to be pumped into the fracture before the proppant $d_{50}$ may be up to 250, 280 or 300 micron, possibly even more.

For particles intended to pass through a proppant pack, the median particle size $d_{50}$ should be considerably smaller than the median particle size of the proppant. For this, median particle size $d_{50}$ may lie in a range from 10 micron up to 100 or 150 micron and $d_{90}$ may possibly be no greater than 250 or 300 micron, possibly no greater than 200 micron. Particles intended to be retained within proppant when it is packed within a fracture should desirably have median particle size similar to the proppant. Both the proppant and the particles to be retained by it may have median particle size $d_{50}$ above 200 micron, preferably above 250 or 300 micron and both may have a $d_{10}$ value which is not less than 20 or 30 micron. Particles to be retained by proppant may have $d_{50}$ which does not exceed 800 or possibly 600 micron. Summarising these preferred values in table form:

|  | $d_{10}$ | Median size $d_{50}$ | $d_{90}$ |
|---|---|---|---|
| retained by filtercake | ≧5 micron possibly ≧5 micron | ≧10 micron possibly ≧15 or 20 micron ≦150 micron possibly ≦100 micron | ≦300 micron possibly ≦250 or 200 micron |
| retained by proppant | ≧20 micron possibly ≧30 micron | ≧200 micron possibly ≧250 or 300 micron possibly ≦800 or 600 micron |  |

The shape of the particles may vary considerably. They may be approximately spherical, but it is also possible that they could be elongate and indeed could take the form of fibers of a carrier matrix material with the oilfield chemical distributed within such fibers The "architecture" of particles may be further elaborated in order to give the desired release profile for the encapsulated oilfield chemical. For example, particles which consist of small islands of the chemical within a continuous carrier matrix could be over-coated with a further material which is soluble in oil but not in water. This would prevent any of the chemical from release while the particles were suspended in an aqueous fracturing fluid but the coating would dissolve, allowing the release of the chemical to begin, at the start of oil production through the fracture.

Encapsulation of an oilfield chemical in a carrier matrix polymer can be carried out by dissolving or dispersing the chemical in a solution of the matrix polymer in an organic solvent, then dispersing this in an aqueous phase to form an emulsion from which the organic solvent is made to evaporate. We have found that such a process allows the size of particles to be controlled, with an acceptably narrow particle size distribution and with good repeatability from batch to batch More specifically we have found that a hydrophobic substance, soluble in organic solvent, can be encapsulated within a polymer using a technique comprising steps of
 (i) dissolving the substance and encapsulating polymer in a water-immiscible organic solvent,
 (ii) dispersing the resulting solution in an aqueous phase to form an oil-in-water emulsion in which the disperse phase is the solution formed in step (i),
 (iii) stirring or otherwise agitating that emulsion while causing or allowing evaporation of the organic solvent, thereby forming particles in which the substance is distributed within a matrix of the polymer.

Hydrophilic, water-soluble substances can be encapsulated by a double emulsion technique. This comprises steps of
 (i) dissolving the substance in water,
 (ii) dissolving the encapsulating polymer in a water-immiscible organic solvent,
 (iii) dispersing the aqueous solution from step (i) in the solvent solution of polymer to form a water-in-oil emulsion,
 (iv) dispersing this emulsion in water to form a water-in-oil-in-water double emulsion, and
 (v) stirring or otherwise agitating that emulsion while causing or allowing evaporation of the organic solvent, thereby forming particles in which small particles of the substance are distributed within a matrix of the polymer.

An insoluble solid in powder form can be encapsulated in an analogous way by
 (i) dissolving the encapsulating polymer in organic solvent,
 (ii) suspending the powder in the solvent solution of polymer in organic solvent,
 (iii) dispersing the resulting suspension in water, to form an emulsion in which the disperse phase is droplets of the organic solvent with the powder suspended within these droplets, and
 (iv) stirring or otherwise agitating that emulsion while causing or allowing evaporation of the organic solvent, thereby forming particles in which small particles of the original powder are distributed within a matrix of the polymer.

In each of these procedures the particle size is affected by the choice of encapsulating polymer and the initial concentration of polymer in organic solvent, because these factors affect the viscosity of the disperse phase, from which organic solvent evaporates. A higher viscosity of this disperse phase leads to larger disperse droplets which in turn leads to larger particles. However, for any chosen composition, the droplet size of the disperse phase and hence the size of the particles can be controlled through the amount of shear applied to stir or agitate the emulsion while solvent evaporates. So, for any chosen encapsulating polymer, the significant parameters influencing particle size are the mixing condition and speed.

All the above procedures lead to an aqueous suspension of particles comprising the oilfield chemical encapsulated with polymer. The particles can be recovered by filtration, washed, dried and stored until required for use.

Other manufacturing techniques are also available for the production of particles with an oilfield chemical encapsulated within a polymer matrix. One possibility is to mix the oilfield chemical into a melt of a polymeric carrier material and then form this melt into particles. This would be applicable in particular when the oilfield chemical was a solid powder. The powder would be mixed into a melt of the polymer matrix material which would then be extruded into fibers with the oilfield chemical distributed within those fibers. If less elongate particles were desired, the fibers could subsequently be chopped into short lengths. A related possibility would be to mix the oilfield chemical in powder form with the matrix polymer, also in powder form, and then heat the mixture until the matrix material melted to an extrudable condition.

Embodiments of this invention and features mentioned above will now be illustrated and exemplified by the examples below and by the drawings and description thereof.

EXAMPLES OF PREPARATION

The following Examples 1 to 8 illustrate the preparation and properties of particles with an oilfield chemical encapsulated within a carrier matrix.

EXAMPLE 1

Encapsulation and Release of Hydrophobic Dye

Tracer particles were made using several encapsulating polymers and using a hydrophobic dye as the tracer substance. This dye was 2-[4-(diethylamino)phenylazo]benzoic acid, more usually known as ethyl red. The organic solvent which was used was dichloromethane ($CH_2Cl_2$). Polyvinyl alcohol (80% hydrolysed polyvinyl acetate) was used as an emulsifier.

Ethyl red (0.020 g) and encapsulating polymer (0.465 g) were dissolved in 10 ml dichloromethane. Polyvinyl alcohol (0.750 g) was dissolved in de-ionised water (150 g) using a mechanical stirrer (Heidolph RZ2050 electronic, 320 rpm) for about 30 min and the solution of dye and polymer in dichloromethane was then added to it, dropwise, to form an emulsion of the dichloromethane solution in the water. This emulsion was stirred at 320 rpm for 2 hours, the time for the dichloromethane solvent to evaporate. The resulting suspension of particles was then poured into 600 ml of de-ionised water and stirred for another 2 hours. The particles were then recovered by vacuum filtration on a cellulose nitrate membrane filter of 0.45 micron pore size and washed thoroughly with water until no coloration of the filtrate water was observed. The particles were then dried under vacuum and stored in a refrigerator.

Three encapsulating polymers used were Poly-L-lactic acid (PLLA), Poly-L/D-lactic acid (PLDLA) and Poly-L/D-lactide-co-glycolic acid (PLGA) (85:15 ratio) purchased from Sigma-Aldrich Chemicals. These all have relatively high molecular weight of about 100,000, and have fairly low glass transition temperatures (Tg) PLLA shows the highest glass transition at 51° C. as compared to 46° C. and 45° C. for PLDLA and PLGA, respectively. A fourth encapsulating polymer was a Poly-L/D-lactic acid (designated PLDLA#2) having a higher molecular weight of about 300,000 and a Tg of 60° C.

Particle size was determined using a Malvern Mastersizer. The size distribution was found to be narrow. The measured values (in micron) were

| Polymer | $d_{10}$ (micron) | $d_{50}$ (micron) | $d_{90}$ (micron) |
|---|---|---|---|
| PLLA | 68.8 | 101.3 | 149.7 |
| PLDLA | 58.8 | 86.8 | 127.4 |
| PGLA | 81.6 | 112.8 | 155.4 |
| PLDLA#2 | | 153.1 | |

It can be seen that similar particle sizes were obtained with all three polymers. Scanning electron microscopy showed the particles to be spherical with a smooth surface. Extraction of dye from a small sample of particles showed that the dye content was approximately 3.3-3.5% by weight.

A similar preparation using PLLA, in which the 320 rpm stirrer was replaced with a Silverson mixer running at 1500 rpm to give higher shear led to smaller particles, with $d_{50}$ below 20 micron.

In order to study the release profiles of the particles at different temperatures, 10 mg sample quantities (made using the 320 rpm stirrer) were suspended in 10 ml de-ionised water (pH 7-8) and incubated in closed bottles at various temperatures. After a period of time the amount of dye released into solution was determined by cooling the bottle and its contents to ambient temperature or below, to stop the release of dye, extracting into organic solvent the dye already released and then examining the extract spectroscopically.

| Polymer | Test Temperature | 1 hr | 24 hr | 48 hr | 64 hr |
|---|---|---|---|---|---|
| PLLA | 55° C. | 0 | 0 | 0 | 0 |
| PLLA | 65° C. | 0 | 15% | 21% | |
| PLLA | 70° C. | 0 | 21% | 35% | 42% |
| PLLA | 95° C. | 40% | | | 66% |
| PLLA | 120° C. | 60% | 80% | | |
| PLDLA#2 | 65° C. | 0 | 35% | | |
| PLDLA#2 | 75° C. | 12% | 51% | | |

Similar results were observed at lower temperature with PLDLA and PLGA

| Polymer | Test Temperature | 1 hr | 70 hr | 120 hr |
|---|---|---|---|---|
| PLDLA | 40° C. | 0 | 0 | 0 |
| PLDLA | 55° C. | 0 | 45% | 65% |
| PLDLA | 95° C. | 45% | 98% | |
| PLGA | 40° C. | 0 | 0 | 0 |
| PLGA | 55° C. | 0 | 45% | 68% |
| PLGA | 95° C. | 39% | 90% | |

These results show a consistent pattern. For each polymer there was no observable release of the encapsulated dye at temperatures below Tg. Above Tg release begins. If the temperature is slightly above Tg the dye was released progressively over time, but if the temperature was further above Tg the release was much more rapid, with a substantial proportion taking place within the first hour. The temperatures were higher for PLLA than for PLDLA and PLGA. This was attributed to partial crystallinity of the PLLA polymer, whereas the others were wholly amorphous.

An experiment was carried out to show that polymers of hydroxy acids degrade slowly in contact with water, with progressive loss of material from the particles. Particles were made by the procedure of Example 1, using two of the above polymers, but no dye was included. Particle sizes were measured and the $d_{50}$ median particle sizes were

| PLLA | d50 = 106 micron |
|---|---|
| PLDLA#2 | d50 = 149 micron. |

For each polymer 20 mg samples of particles were placed in 20 ml de-ionised water and stored at 95° C. or at 120° C. in closed bottles, for various lengths of time. At the end of the storage time, the bottle was cooled in water at 0° C., and the solid was recovered by filtration, washed with deionized water on the filter and dried. The following results were obtained

| Storage at 120° C. Storage time (hours) | Weight lost (% of original weight) PLLA |
|---|---|
| 10 | 15 |
| 24 | 35 |
| 48 | 75 |
| 60 | 97 |

| Storage at 95° C. | Weight lost (% of original weight) | |
| --- | --- | --- |
| Storage time (hours) | PLLA | PLDLA#2 |
| 50 | 5 | 25 |
| 75 | 14 | |
| 190 | 37 | 60 |

Comparison with the results above for dye release at the same temperature shows that dye release by diffusion at temperatures above Tg proceeds faster than particle degradation.

EXAMPLE 2

Encapsulation and Release of Hydrophobic Dye

The procedure of Example 1, using the 320 rpm stirrer, was repeated using polystyrene-co-maleic anhydride (PS-MA) and also using mixtures of PLLA and PS-MA in weight ratios of 95:5, 80:20, 50:50, 30:70. These polymer blends were made by simply dissolving both polymers, in chosen proportions, were both dissolved in the dichloromethane together with the ethyl red dye. The Tg values of these blends were not determined directly, but since PS-MA has a Tg of about 120° C. which is much higher than that of PLLA, the Tg of the blends would increase with increasing proportion of PS-MA.

Release profiles were studied as in Example 1, incubating the samples in closed bottles at 120° C., with the following results:

| Polymer | Test temperature | 1 hr | 5 hr | 10 hr |
| --- | --- | --- | --- | --- |
| PS-MA alone | 120° C. | 0 | 13% | 21% |
| 30% PLLA:70% PS-MA | 120° C. | 15% | 21% | 30% |
| 50% PLLA:50% PS-MA | 120° C. | 45% | 58% | 68% |
| 80% PLLA:20% PS-MA | 120° C. | 50% | 68% | 72% |
| 95% PLLA:5% PS-MA | 120° C. | 61% | 72% | 80% |

It can be seen that the blends with 50% or more PLLA, which have lower Tg, display significant early release, whereas PS-MA alone and 30:70 PLLA:PS-MA give gradual release. It can also be seen that particles made from pure PS-MA showed a steady release at 120° C. after an initial delay: note that no release was observed after 1 hour. When release profiles were studied at 95° C. no release of ethyl red was observed after 15 hours for PS-MA microspheres, as well as PLLA microspheres containing 70 wt. % PSMA.

EXAMPLE 3

Encapsulation and Release of Hydrophobic Dye

The particle preparation procedure of Example 1 was carried out using the 320 rpm stirrer and PLLA as the polymer. The dye was 2-[4-(dimethylamino)phenylazo]benzoic acid, more usually known as methyl red which is a homologue of ethyl red. The encapsulated particles were found to have $d_{50}$ of 106 micron. As in Example 1, sample quantities were suspended in de-ionised water and stored in closed bottles. The storage times and temperatures were 2 days and 20 days at 50° C. and 60° C. The percentages of dye released are given in the table below. It can be seen that the release of dye took place over a number of days.

| Polymer | Test temperature | 2 days | 20 days |
| --- | --- | --- | --- |
| PLLA | 50° C. | 2% | 38% |
| PLLA | 60° C. | 5% | 75% |

EXAMPLE 4

Encapsulation and Release of Hydrophilic Dye

Tracer particles were made using either PLLA or PLDLA#2 as the encapsulating polymer and using a water soluble hydrophilic dye as the tracer substance. This dye was the sodium salt of 4-(4-diethylaminophenylazo)benzenesulfonic acid, more usually known as ethyl orange.

Polyvinyl alcohol (0.375 g) was dissolved in water (150 g) containing 3 wt % sodium chloride using a mechanical stirrer (Heidolph RZ2050 electronic, 320 rpm) for about 30 min. Encapsulating polymer (0.25 g ) was dissolved in 3.7 ml dichloromethane and added to a solution of ethyl orange in water (0.20 ml). Various concentrations of ethyl orange in the water were used. The resulting mixture was stirred using a magnetic stirrer at its maximum rate for 10 min to form a water-in-oil emulsion which was then added dropwise to the saline solution of polyvinyl alcohol over about 3 hours to form a water-in-oil-in-water double emulsion. This double emulsion was then poured into 600 ml of water containing 3 wt % sodium chloride and stirred at 320rpm for another hour. As the dichloromethane solvent evaporated, the dispersed droplets were converted to particles comprising ethyl orange encapsulated by polymer. The particles were recovered by vacuum filtration on a cellulose nitrate membrane filter of 0.45 micron pore size and washed three times with water. The particles were then dried under vacuum and stored in a refrigerator. Examination of particles under an optical microscope showed that each particle contained islands of the ethyl orange in a matrix of the encapsulating PLLA.

This preparation procedure was also carried out using a Silverson mixer at 800 rpm in place of the 320 rpm stirrer to provide greater shear while mixing. The polymers, dye content, mixing speed during preparation and median particle size of a number of samples are given in the following table:

| Polymer | Ethyl orange as wt % of polymer | Mixer speed | $d_{50}$ (micron) |
| --- | --- | --- | --- |
| PLLA | 11.3% | 320 rpm | 201.9 |
| PLLA | 7.7% | 320 rpm | 201.1 |
| PLLA | 4.78% | 320 rpm | 168.3 |
| PLLA | 4.86% | 800 rpm | 50.5 |
| PLLA | 2.42% | 800 rpm | 46.4 |
| PLDLA#2 | 11.04% | 320 rpm | 234.4 |
| PLDLA#2 | 6.5% | 320 rpm | 190.8 |
| PLDLA#2 | 3.6% | 320 rpm | 269.5 |
| PLDLA#2 | 1.8% | 800 rpm | 68.4 |

Particles made in this way using the 300 rpm mixer were examined under an optical microscope. Tiny particles of the orange dye could be seen within the particles of the matrix polymer. The diameter of these tiny particles of dye was estimated as approximately 5 micron.

The release profiles from some of the above particles were studied in the same way as in previous Examples. The following results were obtained:

| Polymer and wt % dye | $d_{50}$ (micron) | Test temperature | 1 hour | 19 hours | 40 hours | 110 hours |
|---|---|---|---|---|---|---|
| PLLA 7.7% | 201.1 | 75° C. | 0 | 10% | 15% | 20% |
| PLLA 7.7% | 201.1 | 95° C. | 0 | 38% | 60% | 100% |
| PLLA 7.7% | 201.1 | 120° C. | 35% | 100% | | |
| PLDLA#2 6.5% | 190.8 | 75° C. | 25% | 45% | 50% | 65% |
| PLLA 4.78% | 168.3 | 75° C. | 3% | 9% | 11% | 20% |
| PLLA 4.86% | 50.46 | 75° C. | 20% | Over 50% | 65% | Over 70% |

It can be observed that, as with encapsulated ethyl red in Example 1, the rate of release from PLLA particles was temperature dependent. Also, particles with PLDLA#2 polymer released dye more quickly than PLLA particles, consistent with the partially crystalline nature of PLLA. Thirdly, comparison of, PLLA particles with approximately 4.8% dye content showed that dye release from the smaller particles made at higher shear was much faster than from larger particles.

EXAMPLE 5

Encapsulation and Release of Hydrophilic Dye

Further particles were made as in the preceding Example, above, using PLLA polymer, 7.7 wt % dye and stirring with the 320 rpm stirrer. The median size $d_{50}$ of these particles was found to be 317 microns. The release profiles from some of the above particles were studied in the same way as in previous Examples, with storage periods of 2 and 20 days The following results were obtained. It can be appreciated from these results that release of the encapsulated dye was taking place over a period of some days.

| Polymer | Test temperature | 2 days | 20 days |
|---|---|---|---|
| PLLA | 50° C. | 5% | 75% |
| PLLA | 60° C. | 7% | 75% |

EXAMPLE 6

Encapsulation of Calcium Peroxide Gel Breaker

Calcium peroxide is known to function as a breaker for gels formed by thickening with guar gum. In this example the calcium peroxide which was used was the product supplied by TPC-Brinadd, a division of Texas United Chemical Co., LLC, Houston, Texas, USA under the trademark BREAKE-C. The product is a pale yellow powder composed of over 60wt% $CaO_2$, not more than 31 wt% $Ca(OH)_2$ and not more than 12 wt% $CaCO_3$. The bulk density of the product is 0.5±0.075g/cm³ (the density of pure calcium peroxide is 2.9g/cm³). The material has a median particle size around 15 micron. It has a low solubility in pure water; the solubility of the main component calcium peroxide is under 0.1gm/liter at 20° C.

Polyvinyl alcohol (0.375 g) was dissolved in water (150 g) using a mechanical stirrer (Heidolph RZ2050 electronic, 320 rpm) for about 30 min. PLLA (0.25 g ) was dissolved in 7 ml dichloromethane to which calcium peroxide powder was then added. The resulting mixture was shaken vigorously to suspend the powder in the dichloromethane solution and added to the solution of polyvinyl alcohol. This was stirred for about 3 hours while dichloromethane solvent evaporated, after which the mixture was poured into a further 600 ml of water and stirred for another hour. The resulting PLLA particles containing encapsulated powder were recovered by vacuum filtration on a cellulose nitrate membrane filter of 0.45 micron pore size and washed three times with water. The particles were then dried under vacuum. This procedure was carried out using three different amounts of calcium peroxide powder. Particles sizes were determined and the results are given in the following table. Uniformity of particle size is apparent.

| Calcium peroxide (gm) | $d_{10}$ (micron) | $d_{50}$ (micron) | $d_{90}$ (micron) |
|---|---|---|---|
| 0.025 | 75 | 127 | 246 |
| 0.013 | 73 | 133 | 344 |
| 0.042 | 75 | 124 | 210 |

EXAMPLE 7

Encapsulation of Calcium Peroxide Gel Breaker

The procedure of the previous Example was repeated on a slightly larger scale using 9% sodium chloride solution in place of water. Polyvinyl alcohol (1.5 g) was dissolved in water (600 g) using a mechanical stirrer (Heidolph RZ2050 electronic, 320 rpm) for about 30 min.

PLLA (1.0 g) was dissolved in 28 ml dichloromethane to which calcium peroxide powder (0.1 g) was then added. The resulting mixture was shaken vigorously to suspend the powder in the dichloromethane solution and added to the solution of polyvinyl alcohol. This was stirred for about 3 hours while dichloromethane solvent evaporated, after which the mixture was poured into a further 600 ml of water and stirred for another hour after which the resulting PLLA particles containing encapsulated powder were recovered as before. The procedure was also carried out using half the quantities of PLLA and calcium peroxide in only 8 ml dichloromethane, thus providing a more viscous dichloromethane solution, which led to an increased particle size for the encapsulated particles.

Particle size measurements on the particles of encapsulated powder are given in the following table.

| | $d_{10}$ (micron) | $d_{50}$ (micron) | $d_{90}$ (micron) |
|---|---|---|---|
| 1.0 g PLLA and 0.1 g $CaO_2$ in 28 ml $CH_2Cl_2$ | 47 | 90 | 190 |
| 0.5 g PLLA in 8 ml $CH_2Cl_2$ | 70 | 119 | 213 |

EXAMPLE 8

Encapsulation of a Breaker Enzyme

The procedure was similar to the encapsulation of a hydrophobic dye in Example 4. Polyvinyl alcohol (0.375 g) was dissolved in water (150 g) containing 3 wt % sodium chloride using a mechanical stirrer (Heidolph RZ2050 electronic, 320 rpm) for about 30 min. PLLA (0.26 g) was dissolved in 3.7 ml dichloromethane and added to a solution of hemicellulase enzyme (0.026 g) in water (0.40 ml). The resulting mixture was stirred using a magnetic stirrer at 1200 rpm to form a water-in-oil emulsion which was then added to the saline solution of polyvinyl alcohol to form a water-in-oil-in-water double emulsion. Mixing was continued for two hours. This double emulsion was then diluted to 600 ml with de-ionised water and stirred at 320rpm for another two hours. The particles were recovered by vacuum filtration on a cellulose nitrate membrane filter of 0.45 micron pore size and washed with de-ionised water. The particles were then dried under vacuum and stored in a refrigerator.

EXAMPLE 9

Encapsulation of Breakers for VES

The procedure of Example 1 was used to encapsulate stearyl alcohol which is known to act as a breaker of for gels made with viscoelastic surfactants. It was also used to encapsulate stearic acid which is also a breaker of the gels made with viscoelastic surfactants, provided the pH is low so that the stearic acid is not ionised. For both stearyl alcohol and stearic acid the percentage encapsulated was 12% by weight, and the encapsulating polymer was PLDLA#2. The $d_{50}$ median particle sizes were

| | |
|---|---|
| 12 weight percent stearic acid | $d_{50}$ = 256 micron |
| 12 weight percent stearyl alcohol | $d_{50}$ = 158 micron |

EXAMPLE 10

Illustration of Use of Encapsulated Breaker

Figure 1:
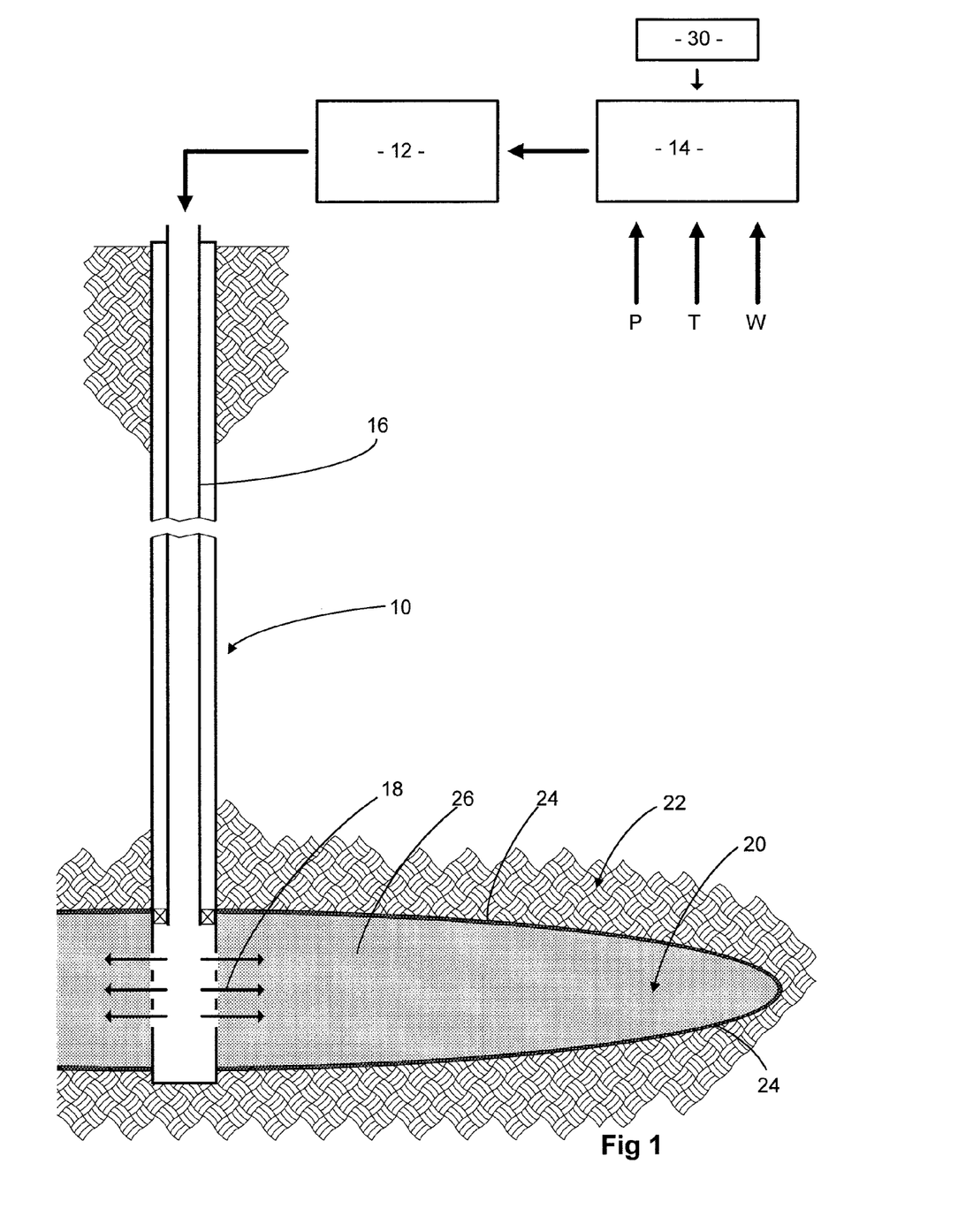
FIG. 1 diagrammatically illustrates mixing of particles into a fracturing fluid and pumping that fluid into a subterranean reservoir to form a fracture.

FIG. 1 shows diagrammatically the arrangement when a fracturing job is carried out. As is conventional for such a job, hydrocarbon production from an existing wellbore 10 is halted and the well head is coupled to pumps 12 supplied by a mixer 14. This mixer is supplied with guar gum as a thickening polymer T, water W and (when required) particulate proppant P as indicated by arrows W, P and T. Viscous fracturing fluid formed by mixing in the mixer 14 is pumped down the production tubing 16 within the wellbore 10 and exits into the reservoir formation 22 as indicated by the arrows 18 at the foot of the well, at a pressure which is sufficiently great to initiate and propagate a fracture 20 in the formation 22 In the early stages of the fracturing job, the fluid does not contain proppant and elongates the fracture, but later on solid, particulate proppant is suspended in the fracturing fluid which is being pumped in. A standard proppant is used: sand having particle size ranging from 425 to 840 micron (20 to 40 US sieve). The fluid leaks off into the formation around the fracture, depositing a filtercake 24 of the thickener on the formation's surfaces exposed to the fracture 20 and packing the fracture with proppant 26 represented by a dot pattern. Pumping of fluid is stopped when the fracture has been formed and packed with proppant. The pressure in the fracture drops as fluid leaks off into the formation and the fracture closes on the proppant pack which remains sufficiently porous to provide a flow path along the fracture and out into the wellbore.

When most of the proppant has been pumped in, device 30 is used to meter in particles containing calcium peroxide breaker encapsulated with PLLA, similar to those prepared in Example 7. Most of these particles pass through the proppant in the fracture but are retained by the filtercake 24 deposited on the surfaces of the formation. Pumping is then stopped and the well is left for a few days to allow the breaker to be released from the particles and react to destroy the filtercake and de-viscosify the fracturing fluid. The aqueous fracturing fluid is then allowed to flow out in preparation for resumed production from the well.

EXAMPLE 11

Illustration of Encapsulated Breaker in Multiple Fractures

Figure 2:
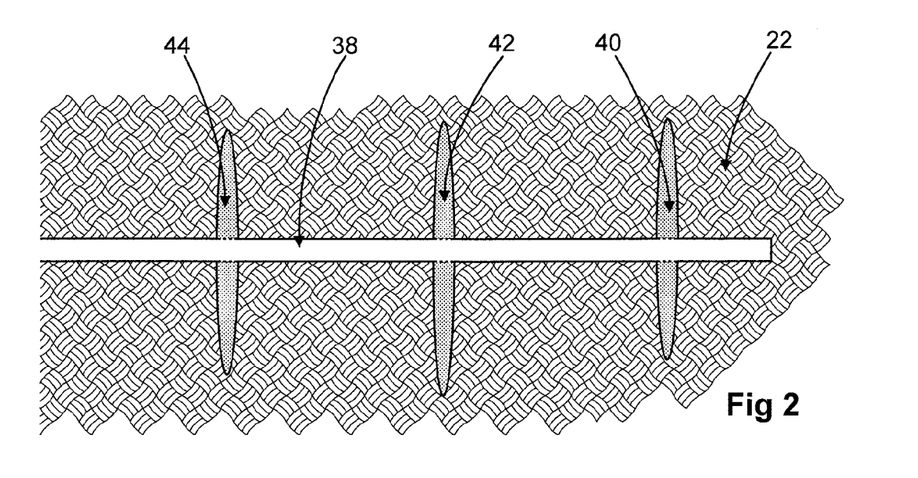
FIG. 2 diagrammatically illustrates a sequence of fractures in a subterranean reservoir.

FIG. 2 illustrates the formation of multiple fractures, (three are shown and designated 40, 42, 44) in a sequence spaced along a wellbore 38 which extends horizontally through a reservoir formation 22. The fractures are formed one at a time by pumping from the surface through equipment which allows the fluid to reach only one fracture position. The present invention is implemented with such an arrangement by delivering encapsulated breaker particles as made in Example 7 into each fracture as it is packed with proppant.

EXAMPLE 12

Illustration of Encapsulated Breaker in Multiple Fractures

Figure 3:
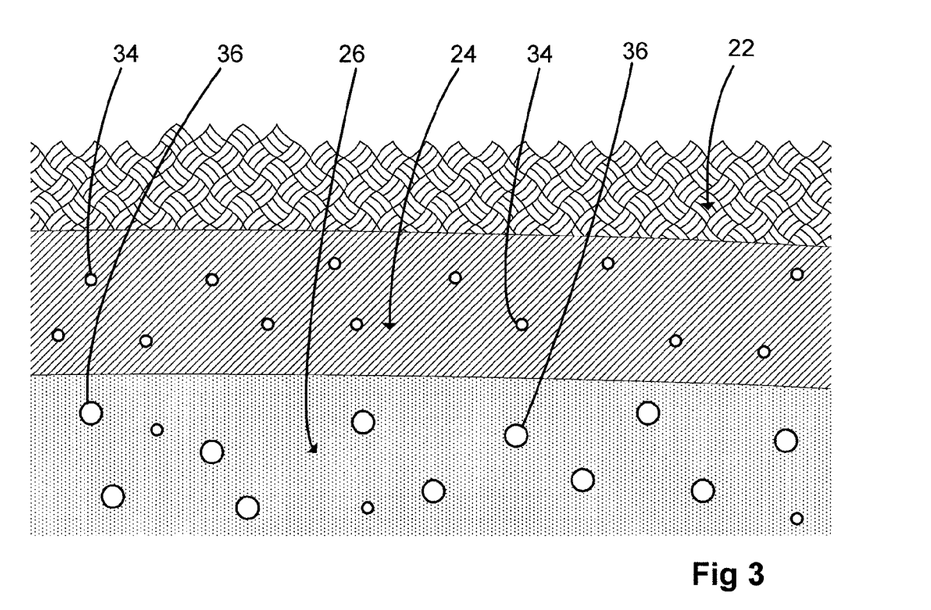
FIG. 3 is an enlarged cross sectional view through the edge region of a fracture.

FIG. 3 is an enlarged view of part of the edge region of the fracture 40. When proppant 26 is pumped into the fracture, two sets of encapsulated particles are metered into the fracturing fluid. One set of particles 34 contain breaker. These particles may be as made in Example 7. Most of those particles become trapped in the filtercake 24 although some remain in the pack of proppant 26. A second set of particles 36 has a larger particles size and these contain a hydrophobic tracer (tracer A). These particles are retained in the pack of proppant 26.

The fracture 42 is fractured similarly, except that the second set of particles delivered to this fracture contain a different hydrophobic tracer (tracer B). The fracture 44 is also fractured in the same way, but the second set of particles delivered to this fracture contain a third hydrophobic tracer (tracer C). After each fracture has been formed, the encapsulated breaker liberated from particles 34 serves to break down the filtercake 24. When hydrocarbon production begins, tracers A, B, and C, liberated within the respective fractures 40, 42, 44 are carried to the surface and detected in samples of the produced hydrocarbon, thus showing that there is hydrocarbon production through all three of the fractures 40, 42, 44.

Figure 4:
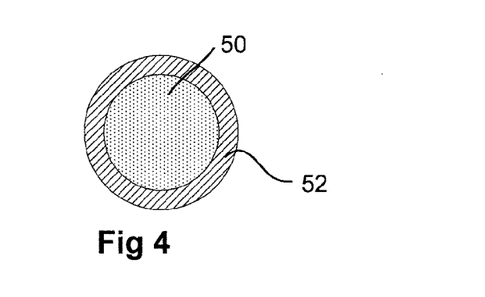
FIG. 4 is a cross section through a composite particle.

FIG. 4 illustrates a possible further development to the "architecture" of particles. A particle made by the procedure used for Examples 1 to 8 provides a core 50, which contains an oilfield chemical distributed within an encansulating polymer matrix. This core 50 is overcoated with a shell 52 of an oil-soluble wax. When such a particle is suspended in an aqueous fracturing fluid no release of the oilfield chemical can occur because the shell 52 provides a barrier surrounding the core. When the particle eventually comes into contact with oil below ground, this is able to dissolve the shell 52, allowing the slow release of oilfield chemical from the core 50 to begin.

The invention claimed is:
1. A process for hydraulic fracturing of a subterranean reservoir formation penetrated by a wellbore, comprising preparing an emulsion with an aqueous continuous phase and a disperse phase which comprises an oilfield chemical and a solution of a water-insoluble carrier matrix material in an organic solvent, evaporating the organic solvent while agitating the emulsion, forming particles which each comprise an oilfield chemical distributed as multiple particles enclosed within a particle of a water-insoluble carrier matrix material, pumping an aqueous suspension of the particles of the carrier matrix material-from the surface via the wellbore and into the reservoir, wherein the carrier matrix material is an organic polymer which has a Tg above 40° C. but below the temperature of the reservoir so as to provide a delayed release of the oilfield chemical from the particles into surrounding fluid through increase in permeability of the matrix upon temperature rise within the reservoir to a temperature above Tg of the matrix, such that the oilfield chemical is liberated from the particles after they have entered the fracture.

2. The process of claim 1 wherein the aqueous suspension of particles is a suspension of the particles in a hydraulic fracturing fluid pumped into the wellbore at sufficient pressure to fracture the formation.

3. The process of claim 2 wherein the fracturing fluid comprises an aqueous dispersion of a thickener.

4. The process of claim 2 wherein the fracturing fluid comprises an aqueous dispersion of a thickener which forms a filtercake on surfaces of the formation exposed to the fracture and the oilfield chemical is a breaker, effective to degrade the thickener in the filtercake.

5. The process of claim 4 wherein the thickener comprises a polysaccharide and the breaker is a peroxide.

6. The process of claim 4 wherein the thickener comprises a polysaccharide and the breaker is an enzyme.

7. The process of claim 4 wherein the thickener in the fracturing fluid comprises a viscoelastic surfactant and the breaker is a compound comprising a hydrophobic chain of at least 12 carbon atoms.

8. The process of claim 1 wherein the organic polymer has a Tg in a range from 40° C. to 175° C.

9. The process of claim 1 wherein the organic polymer is a polymer of a hydroxycarboxylic acid.

10. The process of claim 1 wherein the organic polymer comprises a mixture of polymers.

11. The process of claim 1 wherein at least 75% of the oilfield chemical is retained within the particles of the carrier matrix material until after they enter the fracture.

12. The process of claim 1 wherein at least 50% of the oilfield chemical is liberated into the fracture before the production of hydrocarbon via the fracture.

13. The process of claim 1 wherein at least 95% of the oilfield chemical is liberated into the fracture within 5 days.

14. The process of claim 1 wherein at least 50% of the chemical is retained by the particles of the carrier matrix material for a period of at least 5 days at the temperature of the reservoir and subsequently released.

15. The process of claim 1 wherein the particles of the carrier matrix material have a median particle size of at least 15 micron.

16. The process of claim 1 wherein the particles of the carrier matrix material have a median particle size in a range from 25 to 200 micron.

17. The process of claim 1 comprising a step of pumping a suspension of proppant into the fracture before or concurrently with said particles of the carrier matrix material wherein said particles of the carrier matrix material have a median particle size in a range from 25 to 200 micron.

18. The process of claim 1 comprising a step of pumping a suspension of proppant into the fracture concurrently with said particles of the carrier matrix material wherein said particles have a median particle size of at least 250 micron.

19. The process of claim 1 wherein the particles of the carrier matrix material are elongate fibers.

20. The process of claim 1 wherein the oilfield chemical is a tracer and the process includes a subsequent step of analyzing fluid flowing out of the reservoir via the wellbore to detect the presence or absence of the tracer therein.

21. The process of claim 1 which comprises pumping hydraulic fracturing fluid from the surface via the wellbore and into the reservoir so as to open fractures of the reservoir formation at multiple locations along the length of a wellbore, and comprising pumping said aqueous suspension of particles into each fracture.

22. The process of claim 1 wherein the oilfield chemical has a molecular weight no greater than 1000.

23. The process of claim 1 wherein at least 75% of the oilfield chemical is retained within the particles until after they enter the fracture and at least 50% of the oilfield chemical is liberated into the fracture before the production of hydrocarbon via the fracture.

24. A process for hydraulic fracturing of a subterranean reservoir formation penetrated by a wellbore, comprising preparing an emulsion with an aqueous continuous phase and a disperse phase which comprises an oilfield chemical and a solution of a water-insoluble carrier matrix material in an organic solvent, evaporating the organic solvent while agitating the emulsion, forming particles which each comprise an oilfield chemical distributed as multiple particles enclosed within a particle of a water-insoluble carrier matrix material, pumping an aqueous suspension of the particles of the carrier matrix material from the surface via the wellbore and into the reservoir, wherein the particles of the carrier matrix material have a median particle size in a range from 25 to 200 micron and the carrier matrix material is chosen so as to provide a delayed release of the oilfield chemical from the particles into surrounding fluid through chemical degradation of the matrix within the reservoir such that the oilfield chemical is liberated from the particles after they have entered the fracture.

25. The process of claim 24 wherein the carrier matrix material comprises a polymer of a hydroxycarboxylic acid.

26. A process for hydraulic fracturing of a subterranean reservoir formation penetrated by a wellbore, comprising preparing an emulsion with an aqueous continuous phase and a disperse phase which comprises an oilfield chemical and a solution of a water-insoluble carrier matrix material in an organic solvent, evaporating the organic solvent while agitating the emulsion, forming particles which each comprise an oilfield chemical distributed as multiple particles enclosed within a particle of a water-insoluble carrier matrix material, pumping a hydraulic fracturing fluid which comprises an aqueous dispersion of a thickener from the surface via the wellbore and into the reservoir at sufficient pressure to fracture the formation, the hydraulic fracturing fluid containing suspended particles of the carrier matrix material.

wherein the particles of carrier matrix material have a median particle size in a range from 25 to 200 micron, the oilfield chemical therein is a breaker, effective to degrade the thickener, and the carrier matrix material is an organic polymer which has a Tg above 40° C. but below the temperature of the reservoir so as to provide a delayed release of the breaker from the particles into surrounding fluid through increase in permeability of the matrix upon temperature rise within the reservoir to a temperature above Tg of the matrix, such that the breaker is liberated from the particles at a rate which increases with temperature after they have entered the fracture.

* * * * *